US011299000B2

(12) United States Patent
Ohno et al.

(10) Patent No.: US 11,299,000 B2
(45) Date of Patent: Apr. 12, 2022

(54) ELECTRICALLY POWERED SUSPENSION SYSTEM

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 16/845,211

(22) Filed: Apr. 10, 2020

(65) Prior Publication Data

US 2020/0324604 A1 Oct. 15, 2020

(30) Foreign Application Priority Data

Apr. 12, 2019 (JP) ............................ JP2019-076547

(51) Int. Cl.
*B60G 17/016* (2006.01)
*B60G 17/015* (2006.01)

(52) U.S. Cl.
CPC ...... *B60G 17/0157* (2013.01); *B60G 2202/42* (2013.01); *B60G 2400/252* (2013.01); *B60G 2400/71* (2013.01); *B60G 2400/90* (2013.01)

(58) Field of Classification Search
CPC ............ B60G 17/0157; B60G 2202/42; B60G 2400/252; B60G 2400/71; B60G 2400/90
USPC ........................................... 280/5.515, 5.519
See application file for complete search history.

(56) References Cited

U.S. PATENT DOCUMENTS 8,041,479 B2 * 10/2011 Buma ................ B60G 17/0272 701/37
8,525,453 B2 * 9/2013 Ogawa ................... B60G 17/08 318/368
8,682,530 B2 * 3/2014 Nakamura ........... B60G 17/018 701/37
8,843,274 B2 * 9/2014 Ogawa ................... B60G 17/08 701/37
9,657,806 B2 * 5/2017 Kato ...................... B60G 13/00
10,415,664 B2 * 9/2019 Toyohira ................ B60G 15/02
(Continued)

FOREIGN PATENT DOCUMENTS

JP 2003-019973 A 1/2003
JP 2010-132222 A 6/2010

*Primary Examiner* — Toan C To
(74) *Attorney, Agent, or Firm* — Rankin, Hill & Clark LLP

(57) ABSTRACT

An electrically powered suspension system 11 achieves vibration control of a vehicle without disturbing a vehicle behavior and impairing riding comfort even if an electric motor 31 of an electromagnetic actuator 13 generates excessive heat, wherein the electromagnetic actuator 13 includes the electric motor 31 generating a driving force for vibration damping and extension/contraction; a target damping force setting part 51 setting a target damping force; a target extension/contraction setting part 53 setting a target extension/contraction force; and a drive controller 49 performing the drive control of the electric motor 31 using a drive force based on the target damping force and target extension/contraction force by limiting the motor current not to exceed a current threshold that is an addition of a damping current threshold and extension/contraction current threshold, which thresholds are separately configured considering a priority of riding comfort and steering stability.

6 Claims, 10 Drawing Sheets

(56) References Cited

U.S. PATENT DOCUMENTS

| | | | | |
|---|---|---|---|---|
| 11,065,931 | B1* | 7/2021 | Keas | B60G 17/0157 |
| 2010/0025946 | A1* | 2/2010 | Inoue | B60G 17/0521 280/6.157 |
| 2015/0088379 | A1* | 3/2015 | Hirao | B60G 17/08 701/37 |
| 2018/0297433 | A1* | 10/2018 | Ohno | B60G 17/016 |
| 2018/0361813 | A1* | 12/2018 | Ohno | B60G 17/018 |
| 2020/0262477 | A1* | 8/2020 | Hirao | B60G 17/0195 |
| 2020/0298645 | A1* | 9/2020 | Hirao | B60G 17/018 |
| 2020/0307338 | A1* | 10/2020 | Ohno | B60G 17/06 |
| 2020/0324603 | A1* | 10/2020 | Ohno | B60G 17/08 |
| 2020/0331316 | A1* | 10/2020 | Ohno | B60G 17/0165 |
| 2021/0291606 | A1* | 9/2021 | Kanda | B60G 17/016 |
| 2021/0291609 | A1* | 9/2021 | Goto | B60G 17/0157 |
| 2021/0291610 | A1* | 9/2021 | Goto | B60G 17/0157 |

* cited by examiner

ELECTRICALLY POWERED SUSPENSION SYSTEM

CROSS REFERENCE TO RELATED APPLICATIONS

This application claims the benefit of foreign priority to Japanese Patent Application No. 2019-076547, filed on Apr. 12, 2019, which is incorporated by reference in its entirety.

TECHNICAL FIELD

The present invention relates to an electrically powered suspension system including an electromagnetic actuator. The electromagnetic actuator is disposed between a vehicle body and a wheel and includes an electric motor that generates a driving force used for vibration damping and extension/contraction.

BACKGROUND ART

A conventionally well-known electrically powered suspension system includes an electromagnetic actuator that is installed between a vehicle body and a wheel, and includes an electric motor generating a driving force used for vibration damping and extension/contraction (for example, see PTL 1). The electromagnetic actuator includes a ball screw mechanism in addition to the electric motor. The electromagnetic actuator operates to generate a driving force for the vibration damping and extension/contraction by converting rotary motion of the electric motor into linear motion of the ball screw mechanism.

Here, the driving force used for the vibration damping is called as a damping force. The damping force means a force directed to a different direction from a direction of a stroke speed of the electromagnetic actuator. On the other hand, the driving force used for the extension/contraction is called as an extension/contraction force. The extension/contraction force means a force generated regardless of the direction of the stroke speed.

In addition, another technique is known, to protect a motor mounted on the vehicle from damage by constantly monitoring a temperature of the motor and determining the motor current is in an excessive heat generation state and then limiting the motor current if the temperature of the motor exceeds a predetermined temperature (for example, see PTL 2).

CITATION LIST

Patent Literature

PTL 1: Japanese Patent Application Unexamined Publication No. 2010-132222

PTL 2: Japanese Patent Application Unexamined Publication No. 2003-019973

SUMMARY OF INVENTION

Technical Problem

Here, it is assumed that the electrically powered suspension system according to PTL 1 is provided with a motor protection technology according to PTL 2, to perform damping control of an electromagnetic actuator having an electric motor as a driving force source. In such a motor protection technology, the electric motor is assumed to be in an excessive heat generation state. And, a value of a drive current supplied to the electric motor is uniformly limited with a predetermined limitation threshold in order to protect the electric motor from damage.

In such a case of the excessive heat generation state, the damping force generated by the electromagnetic actuator becomes weaker than in a normal state. Then, the unsprung vibration becomes not sufficiently suppressed. As a result, the behavior of the vehicle may be disturbed.

Similarly, the extension/contraction force of the electromagnetic actuator is weakened in the excessive heat generation state as compared with the normal state. Then, for example, the vehicle may not be kept in a stable posture based on a skyhook control. This result in a possibility that riding comfort of the vehicle may be impaired.

The present invention is made in view of the above problems, and an object of the present invention is to provide an electrically powered suspension system capable of performing vibration control of a vehicle without disturbing a behavior of the vehicle and without impairing the riding comfort of the vehicle as much as possible even when the electric motor provided in the electromagnetic actuator is in an excessive heat generation state.

Solution to Problem

In order to achieve the above object, the present invention provides an electrically powered suspension system comprising: an electromagnetic actuator disposed between a vehicle body and a wheel and including an electric motor generating a driving force used for vibration damping and for extension/contraction; a damping force calculator calculating a target damping force that is a target value of the vibration damping used for the electromagnetic actuator; an extension/contraction force calculator calculating a target extension/contraction force that is a target value of the extension/contraction of the electromagnetic actuator; a drive controller that performs drive control of the electric motor using a target driving force based on the damping force calculated by the damping force calculator and the target extension/contraction force calculated by the extension/contraction force calculator, wherein the drive controller performs a drive control to limit a drive current for the electric motor so that a current correlation value correlated with the drive current for the electric motor does not exceed a predetermined current limitation threshold; and the current limitation threshold includes a damping current limitation threshold for acquiring a target driving force based on the target damping force and an extension/contraction current limitation threshold for acquiring a target driving force based on the target extension/contraction force; and the damping current limitation threshold and the extension/contraction current limitation threshold may be set separately.

Advantageous Effects of Invention

The present invention allows an electrically powered suspension system to perform vibration control of a vehicle without disturbing a behavior of the vehicle and without impairing riding comfort of the vehicle as much as possible even when the electric motor provided in the electromagnetic actuator is in an excessive heat generation state.

BRIEF DESCRIPTION OF DRAWINGS

The drawings described herein are for illustration purposes only and are not intended to limit the scope of the present disclosure in any way.

DESCRIPTION OF EMBODIMENTS

Figure 1:
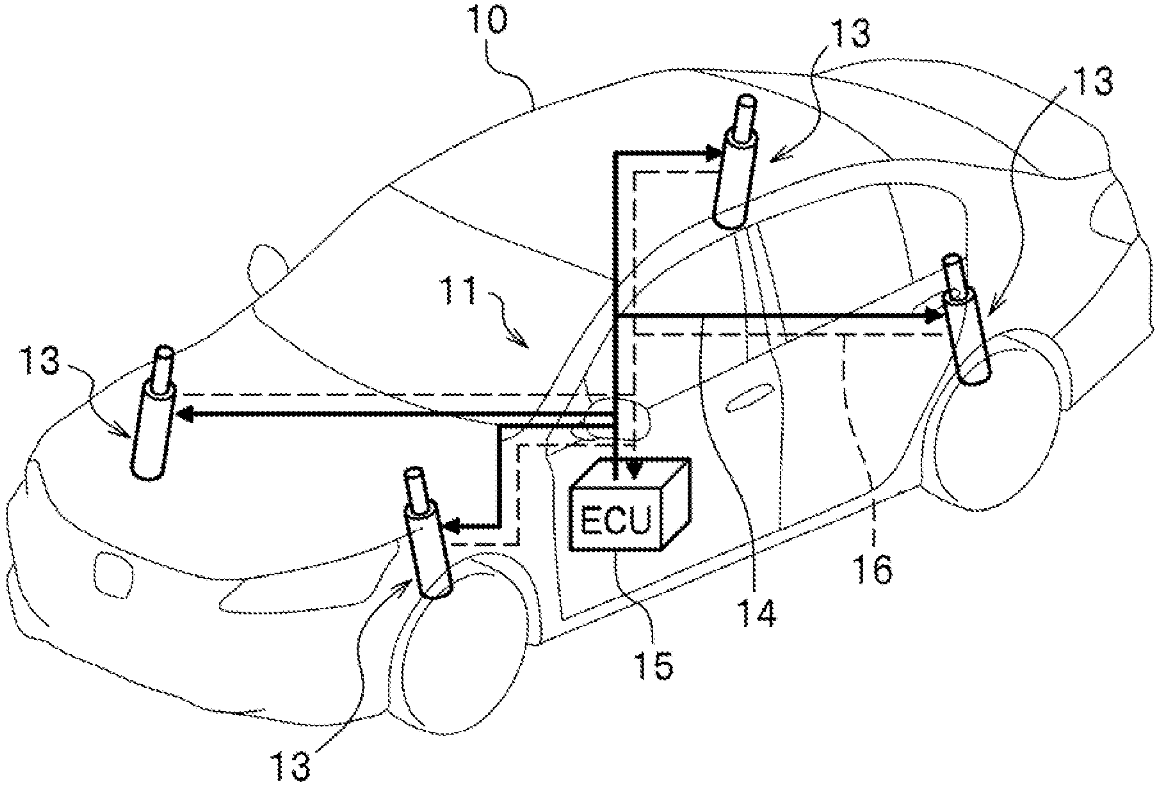
FIG. 1 is an overall configuration diagram of an electrically powered suspension system according to an embodiment of the present invention.

Hereinbelow, description is given of an electrically powered suspension system according to an embodiment of the present invention in detail with reference to the drawings as appropriate.

In the drawings described below, members having functions common thereto are denoted by common reference numerals. Further, a size and shape of the member may be schematically represented by deformation or exaggeration for convenience of explanation.

<Basic Configuration Common to All Embodiments of the Present Invention>

Figure 2:
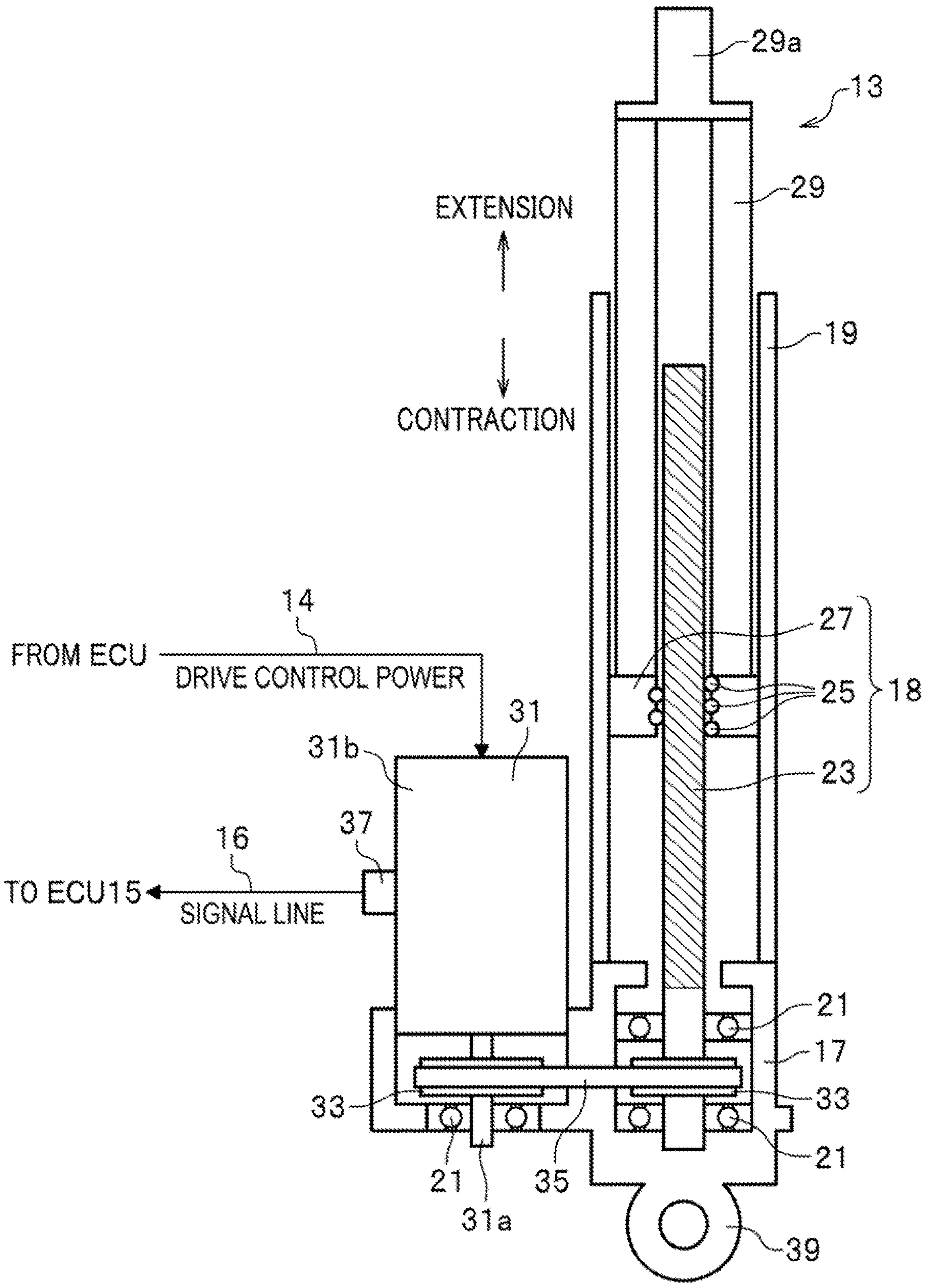
FIG. 2 is a partial sectional view of an electromagnetic actuator provided in the electrically powered suspension system.

First, description is given of a basic configuration common to all the electrically powered suspension systems 11 according to embodiments of the present invention with reference to FIGS. 1 and 2.

FIG. 1 is a diagram showing the overall configuration of an electrically powered suspension system 11 according to one embodiment of the present invention. FIG. 2 is a partially sectional view of an electromagnetic actuator 13 partially constituting the electrically powered suspension system 11.

As shown in FIG. 1, the electrically powered suspension system 11 according to the embodiment of the present invention includes a plurality of electromagnetic actuators 13 provided for respective wheels 10 and one electronic control device (hereinbelow, referred to as "ECU") 15. The ECU 15 is connected with each of the plurality of the electromagnetic actuators 13 through a power supply line 14 (see a solid line in FIG. 1) supplying drive control power from the ECU 15 to each electromagnetic actuators 13 and a signal line 16 (see a broken line in FIG. 1) transmitting a rotation angle signal of the electric motor 31 (see FIG. 2).

In the present embodiment, four of the electromagnetic actuators 13 are provided respectively to the wheels including front wheels (front right wheel, front left wheel) and rear wheels (rear right wheel, rear left wheel). The electromagnetic actuators 13 provided for each wheel are driven and controlled separately from each other in each synchronization with the extension/contraction for each wheel.

In the embodiment of the present invention, unless otherwise stated, each of the plurality of electromagnetic actuators 13 has a configuration common to each other. Therefore, all the plurality of electromagnetic actuators 13 are described by explaining a configuration of one electromagnetic actuator 13.

As shown in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 rotatably supports a base end portion of the ball screw shaft 23 around it with interposition of the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 with interposition of the plurality of balls 25, and converts rotational motion of the ball screw shaft 23 into linear motion. The inner tube 29 connected to the nut 27 is integrated with the nut 27 and displaceable in an axial direction of the outer tube 19.

As seen in FIG. 2, the electromagnetic actuator 13 includes the electric motor 31, a pair of pulleys 33, and a belt member 35 in order to transmit a rotational driving force to the ball screw shaft 23. The electric motor 31 is provided on the base housing 17 so as to be arranged in parallel with the outer tube 19. The pulleys 33 are respectively attached to a motor shaft 31*a* of the electric motor 31 and the ball screw shaft 23. The belt member 35 for transmitting the rotational driving force of the electric motor 31 to the ball screw shaft 23 is put round the pair of pulleys 33.

The electric motor 31 is provided with a resolver 37 for detecting a rotation angle of the electric motor 31. The rotation angle of the electric motor 31 detected by the resolver 37 is sent to the ECU 15 via the signal line 16. The electric motor 31 is controlled in its rotational driving force by the ECU 15 in accordance with the drive control power to be supplied to each of the plurality of electromagnetic actuators 13 via the power supply line 14.

According to this embodiment, as seen in FIG. 2, a dimension in the axial direction of the electromagnetic actuator 13 is shortened by employing a layout in which the motor shaft 31*a* of the electric motor 31 and the ball screw shaft 23 are arranged substantially in parallel and connected with each other. However, another layout may be employed in which, for example, the motor shaft 31*a* of the electric motor 31 and the ball screw shaft 23 are coaxially arranged and connected to each other.

As seen in FIG. 2, the electromagnetic actuator 13 according to this embodiment has a connecting portion 39 provided at a lower end of the base housing 17. The connecting portion 39 is connected and fixed to an unsprung member (not shown) such as a lower arm and a knuckle provided on the wheel. On the other hand, an upper end portion 29*a* of the inner tube 29 is connected and fixed to a sprung member (not shown) such as a strut tower portion provided on the vehicle body. In other words, the electromagnetic actuator 13 is arranged in parallel with a spring member (not shown) provided between the body and the wheel of the vehicle 10. The sprung member is provided with a sprung acceleration sensor 40 (see FIG. 3) detecting the acceleration of the vehicle body (sprung) along the stroke direction of the electromagnetic actuator 13.

The electromagnetic actuator 13 configured as described above operates as follows. For example, it is assumed that momentum relating to upward vibration is inputted to the connecting portion 39 from a wheel of the vehicle 10. In this case, the inner tube 29 and the nut 27 are about to together descend with respect to the outer tube 19 to which the momentum relating to the upward vibration has been applied. In response to the above momentum, the ball screw shaft 23 tries to rotate in a direction following the descending of the nut 27. At this time, the rotational driving force of the electric motor 31 is generated in a direction preventing the nut 27 from descending. The rotational driving force of the electric motor 31 is transmitted to the ball screw shaft 23 via the belt member 35.

In this way, the vibration transmitted from the wheel to the vehicle body is damped by applying a reaction force (damping force) that is against the momentum relating to the upward vibration to the ball screw shaft 23.

<Configuration of Internal and Peripheral Parts of ECU 15>

Next, an internal configuration and a peripheral configuration of the ECU 15 equipped in the electrically powered suspension system 11 is described with reference to FIGS. 3, 4A, 4B, 5A, and 5B.

Figure 3:
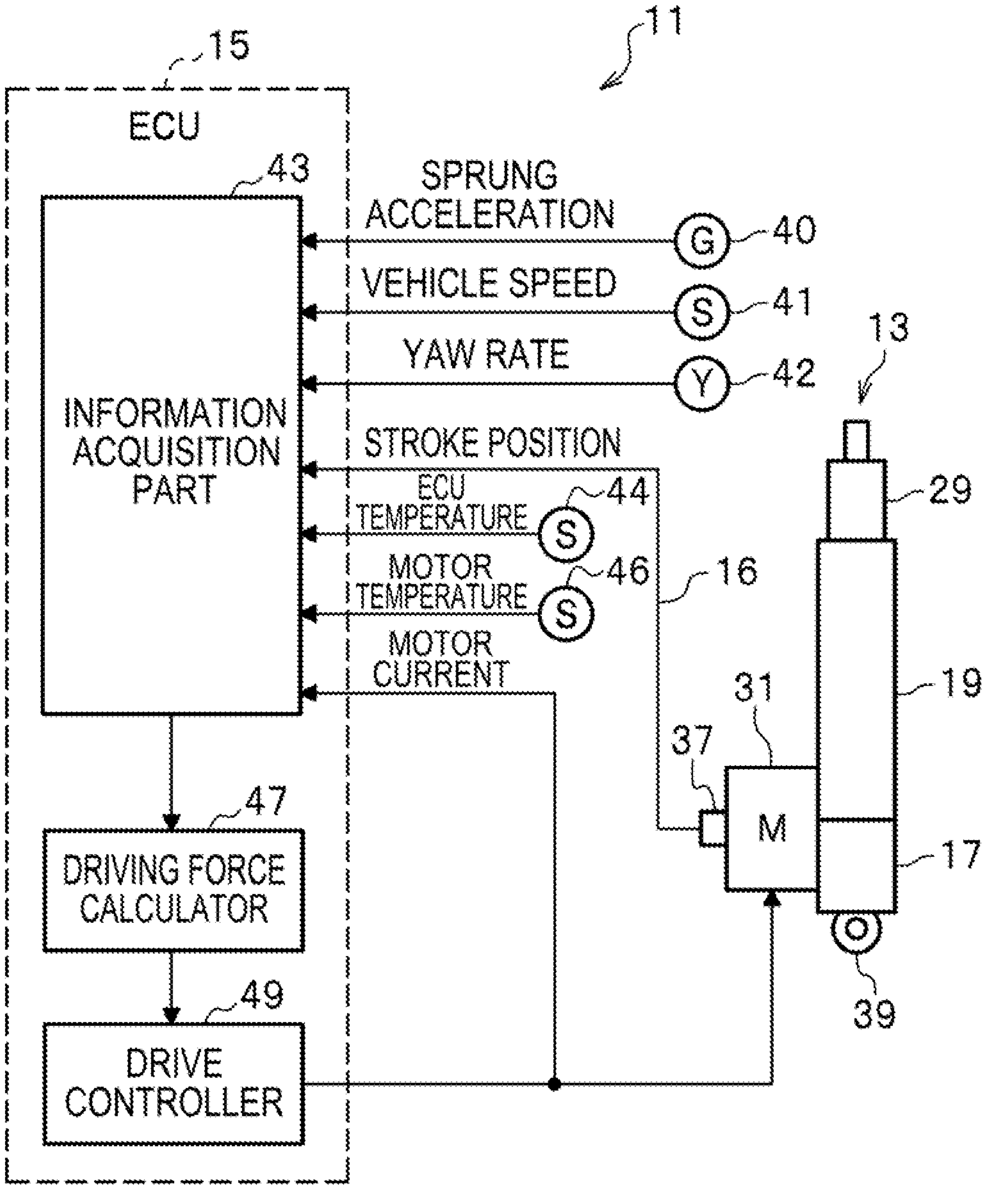
FIG. 3 is a block diagram of internal and peripheral portions of an ECU (Electronic Control Unit) included in the electrically powered suspension system.
Figure 4A:
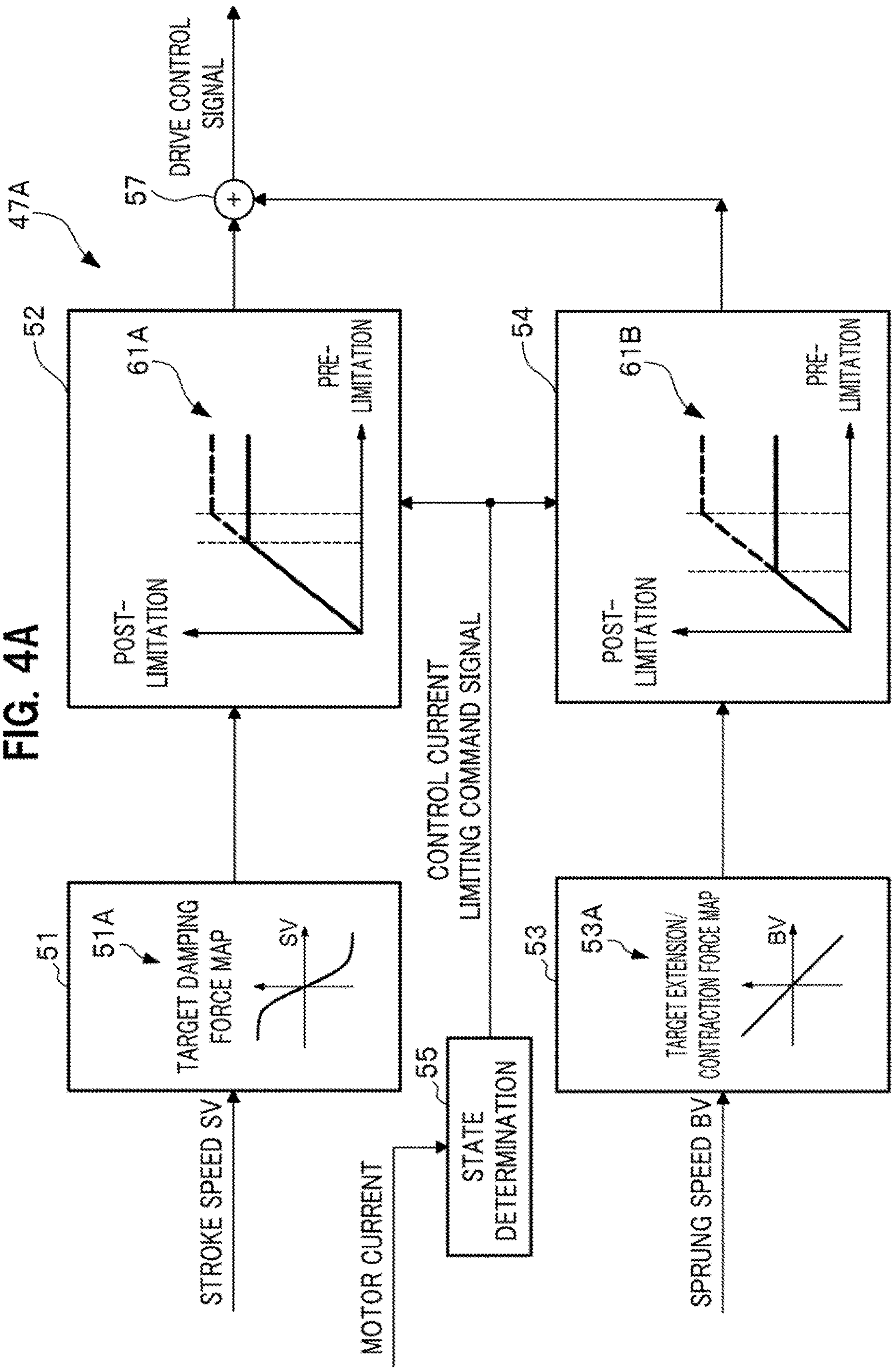
FIG. 4A is a block diagram conceptually showing an internal configuration of an example of a driving force calculator included in the ECU provided in the electrically powered suspension system.
Figure 4B:
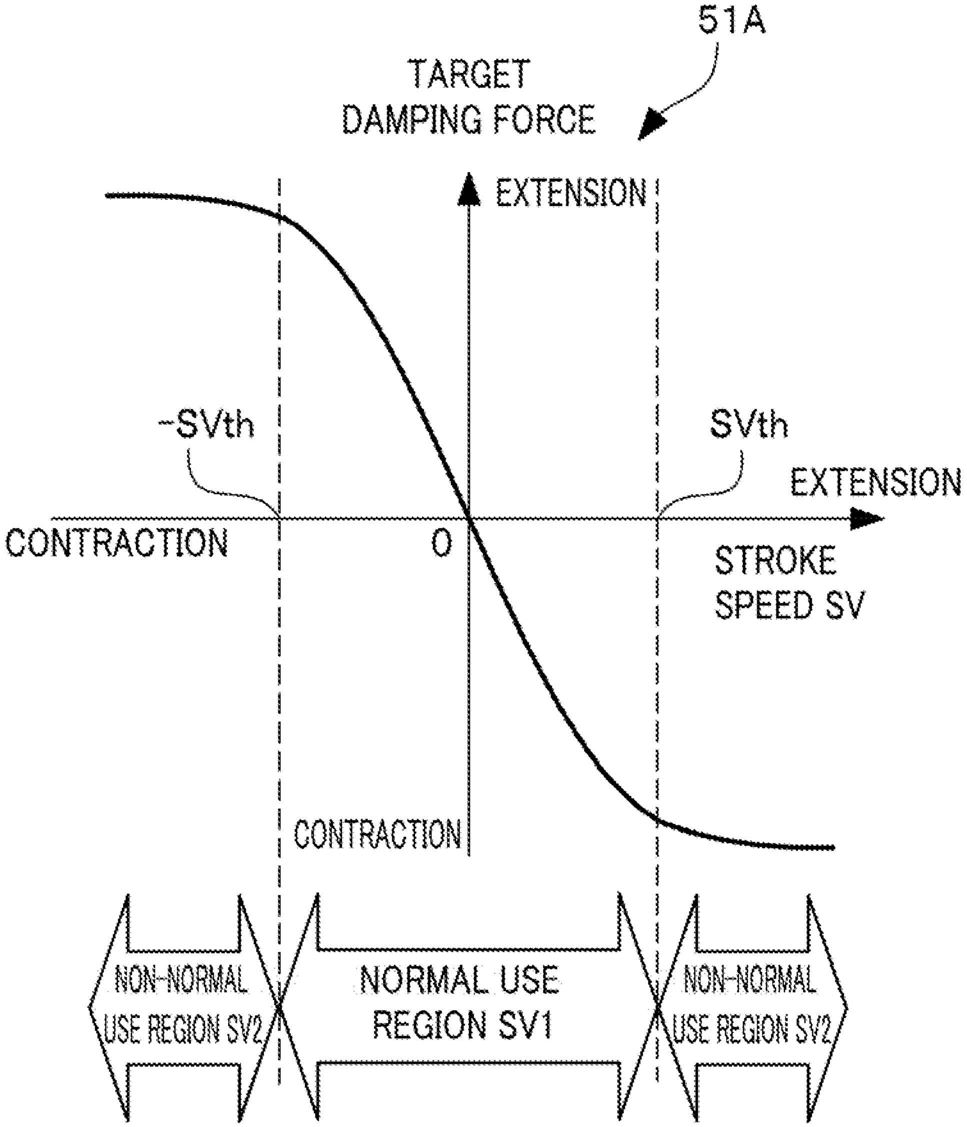
FIG. 4B is an explanatory diagram conceptually illustrating a target damping force map describing a relationship between a target damping force and a stroke speed in which the target damping force varies in response to changes of the stroke speed.
Figure 5A:
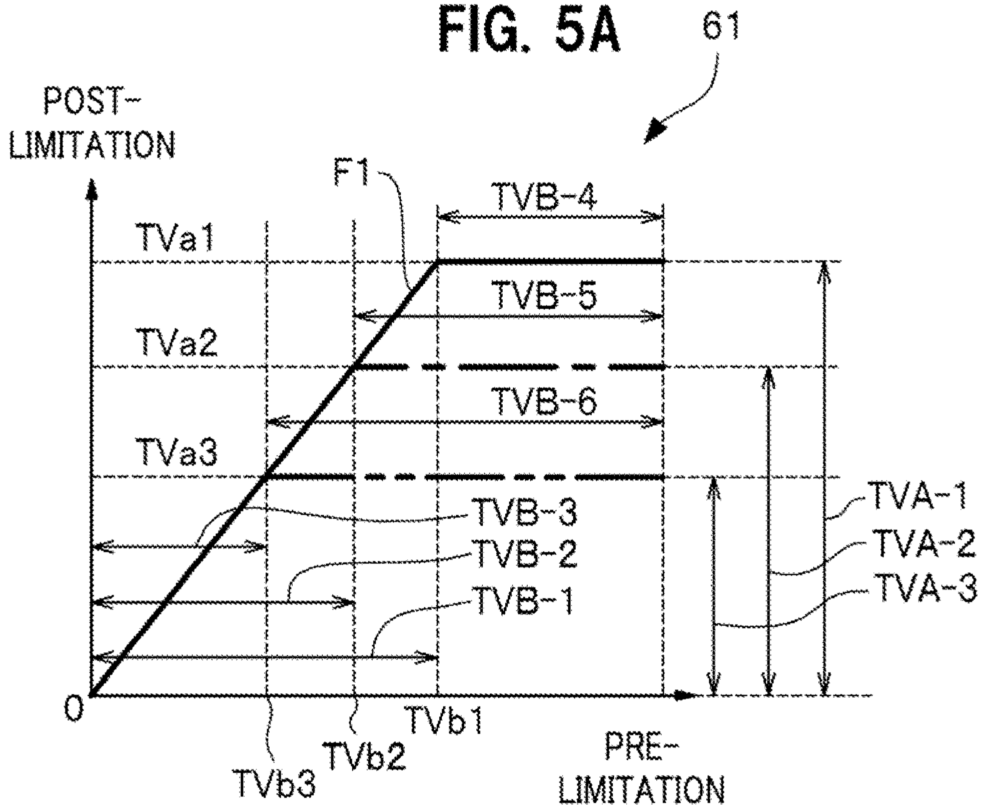
FIG. 5A is an explanatory diagram conceptually illustrating a pre/post-limitation target value map according to the embodiment, which map describes a relationship between before and after the target damping force and the target extension/contraction force are limited when a control current limitation command signal is received.
Figure 5B:
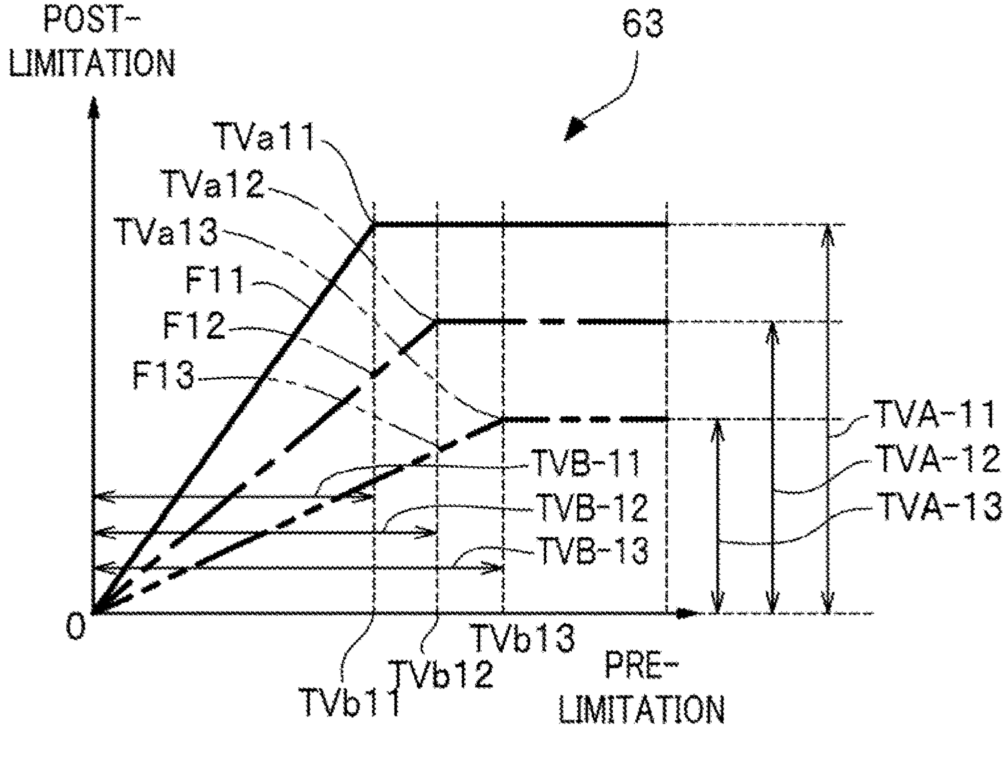
FIG. 5B is an explanatory diagram conceptually illustrating a pre/post-limitation target value map according to a modification, which map describes a relationship between before and after the target damping force and the target extension/contraction force are limited when the control current limitation command signal is received.

FIG. 3 is a diagram showing the internal configuration and peripheral configurations of the ECU 15 equipped in the electrically powered suspension system 11. FIG. 4A is a diagram conceptually illustrating an internal configuration of a driving force calculator 47A according to the embodiment provided in the ECU 15 of the electrically powered suspension system 11. FIG. 4B is an explanatory diagram conceptually showing a damping force map describing a relationship between a stroke speed SV and a target damping force that changes accompanying with a change in the stroke speed SV. FIG. 5A is an explanatory diagram conceptually illustrating a pre/post-limitation target value map 61 according to an embodiment that describes a relationship between forces before and after limitation of the target damping force and the target extension/contraction force when receiving a control current limitation command signal. FIG. 5B is an explanatory diagram conceptually illustrating a pre/post-limitation target value map 63 according to a modification that describes a relationship between forces before and after limitation of the target damping force and the target extension/contraction force when receiving the control current limitation command signal.

The ECU 15 includes a microcomputer configured to perform various arithmetic processing. The ECU 15 has a drive control function of generating a driving force used for vibration damping of the vehicle by controlling driving of each of the plurality of electromagnetic actuators 13, for example, based on a rotation angle of the electric motor 31 detected by the resolver 37.

In order to achieve such a driving-control function, as seen in FIG. 3, the ECU 15 includes an information acquisition part 43, a driving force calculator 47, and a drive controller 49.

In the present embodiment, the ECU 15 corresponds to the "drive control unit" described in CLAIMS of the present invention.

As shown in FIG. 3, the information acquisition part 43 acquires the rotation angle signal of the electric motor 31 detected by the resolver 37 as time-series information relating to a stroke position, and acquires information on a stroke velocity SV by time-differentiating the time-series information of the stroke position.

Further, as shown in FIG. 3, the information acquisition part 43 acquires information on the ECU temperature Te detected by an ECU temperature sensor 44 provided on, for example, a substrate of the ECU 15, and information of the motor temperature Tm detected by a motor temperature sensor 46 provided on, for example, the housing of the electric motor 31.

However, the information on the ECU temperature Te (including the information on an ambient temperature around the ECU 15) is used by a driving force calculator 47B according to a first modification described below. Further, the information on the motor temperature Tm (including information on the ambient temperature around the electric motor 31) is used by a driving force calculator 47C according to a second modification described below. Therefore, the information acquisition part 43 included in the electrically powered suspension system 11 according to the embodiment can omit the acquisition of the information on the ECU temperature Te and the motor temperature Tm.

Further, as shown in FIG. 3, the information acquisition part 43 acquires time-series information on sprung acceleration detected by a sprung acceleration sensor 40; and information on a sprung speed BV by time-integrating the time-series information on the sprung acceleration.

Further, as shown in FIG. 3, the information acquisition part 43 acquires vehicle speed information detected by the vehicle speed sensor 41, yaw rate information detected by the yaw rate sensor 42, and information on a motor current supplied to the electric motor 31 to achieve the target driving force of the electromagnetic actuator 13.

The above types of the information acquired through the information acquisition part 43, such as the information on the stroke speed SV, the information on the ECU temperature and the motor temperature, the information on the sprung speed BV, the information on the vehicle speed, the information on the yaw rate, and the information on the motor current, are respectively sent to the driving force calculator 47.

The driving force calculator 47A of the embodiment, as shown in FIG. 4A, includes a target damping force setting part 51, a target damping force limiting part 52, a target extension/contraction force setting part 53, a target extension/contraction force limiting part 54, a state determination part 55, and an adder 57.

The driving force calculator 47A of the embodiment basically works to calculate respectively a target damping force that is a target value of the vibration damping of the electromagnetic actuator 13; and a target extension/contraction force that is a target value of the extension/contraction operation, and to calculate a target driving force necessary for the vibration damping and the extension/contraction of the electromagnetic actuator 13 so as to achieve the target damping force and target extension/contraction force calculated.

Here, the driving force calculator 47A of the embodiment performs state determination on whether or not the electric motor 31 is in an excessive heat generation state based on information of a integrated motor current value Tint (detailed below) acquired by performing time-integration of time-series information on the motor current.

However, the state determination on whether or not the electric motor 31 is in the excessive heat generation state may be performed based on the information on the ECU temperature Te acquired in a predetermined cycle (detailed below as the driving force calculator 47B according to the first modification), or performed based on the information on the motor temperature Tm acquired in a predetermined cycle (detailed below as the driving force calculator 47C according to the second modification).

Furthermore, the state determination on whether or not the electric motor 31 is in the excessive heat generation state may be performed based on information on an ECU temperature integrated value Teint acquired by time-integrating the time series information relating to the ECU temperature Te acquired in a predetermined cycle; or based on information of a motor temperature integrated value Tmint acquired by time-integrating the time-series information on the motor temperature Tm acquired at a predetermined cycle.

Note that in the present specification, the driving force calculator 47A of the embodiment, the driving force calculator 47B according to the first modification, and the driving force calculator 47C according to the second modification are collectively referred to as "driving force calculator 47".

The driving force calculator 47 of the present embodiment corresponds to a "current calculator" of Claims of the present invention.

More specifically, the target damping force setting part 51 provided in the driving force calculator 47A of the embodiment configures a value of the target damping force responsive to the stroke speed SV based on the information on the stroke speed SV acquired via the information acquisition part 43 and a target damping force map 51A (see FIG. 4B) conceptually representing a relationship between the target damping force and the stroke speed in which the target damping force varies in response to variations of the stroke speed. The target damping force map 51A stores in an actual implementation a target value of a damping force control current (a value of the target damping current) as a value corresponding to the value of the target damping force.

As seen in FIG. 4B, a domain of the stroke velocity SV of the target damping force map 51 includes a normal use region SV1 and non-normal use regions SV2. The normal use region SV1 is a velocity region in which a magnitude of the stroke velocity SV is equal to or smaller than a normal use velocity threshold SVTh ($|SV|-SVTh\leq 0$). During the regular running of the vehicle, most values of the stroke velocity SV converge into the normal use region SV1.

The normal use velocity threshold SVTh may be configured to an appropriate value by consulting an evaluation result acquired by evaluating a probability density function of the stroke velocity SV through experiments, simulations, and the like; and by considering that a predetermined distribution ratio is satisfied by a distribution ratio of the stroke velocity SV appearing respectively in the normal use region SV1 and the non-normal use regions SV2.

As seen in FIG. 4B, a target damping force characteristic relating to the target damping force map 51A in the normal use region SV1 has a characteristic such that the target damping force directed toward a contraction direction increases substantially linearly as the stroke velocity SV increases toward an extension direction, whereas the target damping force directed toward the extension direction increases substantially linearly as the stroke velocity SV increases toward the contraction direction. This characteristic is made similar to a damping characteristic of a conventionally used hydraulic damper. Note that the corresponding target damping force is also zero when the stroke velocity SV is zero.

A target damping force characteristic of the non-normal use region SV2 in the target damping force map 51A, as seen in FIG. 4B, similarly to the target damping force characteristic of the normal use region SV1 in the target damping force map 51A, has a characteristic such that the target damping force directed toward the contraction direction increases substantially linearly as the stroke velocity SV increases toward the extension direction, whereas the target damping force directed toward the extension direction increases substantially linearly as the stroke velocity SV increases toward the contraction direction.

However, as seen in FIG. 4B, the target damping force characteristic in the non-normal use region SV2 of the target damping force map 51A is configured to have a gentle slope as compared with a slope of the target damping force characteristic in the normal use region SV1 of the target damping force map 51A.

On the other hand, the target extension/contraction force setting part 53 provided in the driving force calculator 47A of the embodiment configures a value of the target extension/contraction force responsive to the sprung speed BV acquired by the information acquisition part 43 and a target extension/contraction force map 53A (see FIG. 4C) conceptually representing a relationship between the sprung speed BV and the target extension/contraction force that varies accompanying with variations of the sprung speed BV. Note that the target extension/contraction force map in an actual implementation stores a target value of an extension/contraction control current (a value of the target extension/contraction current) as a value corresponding to the target extension/contraction force.

Figure 4C:
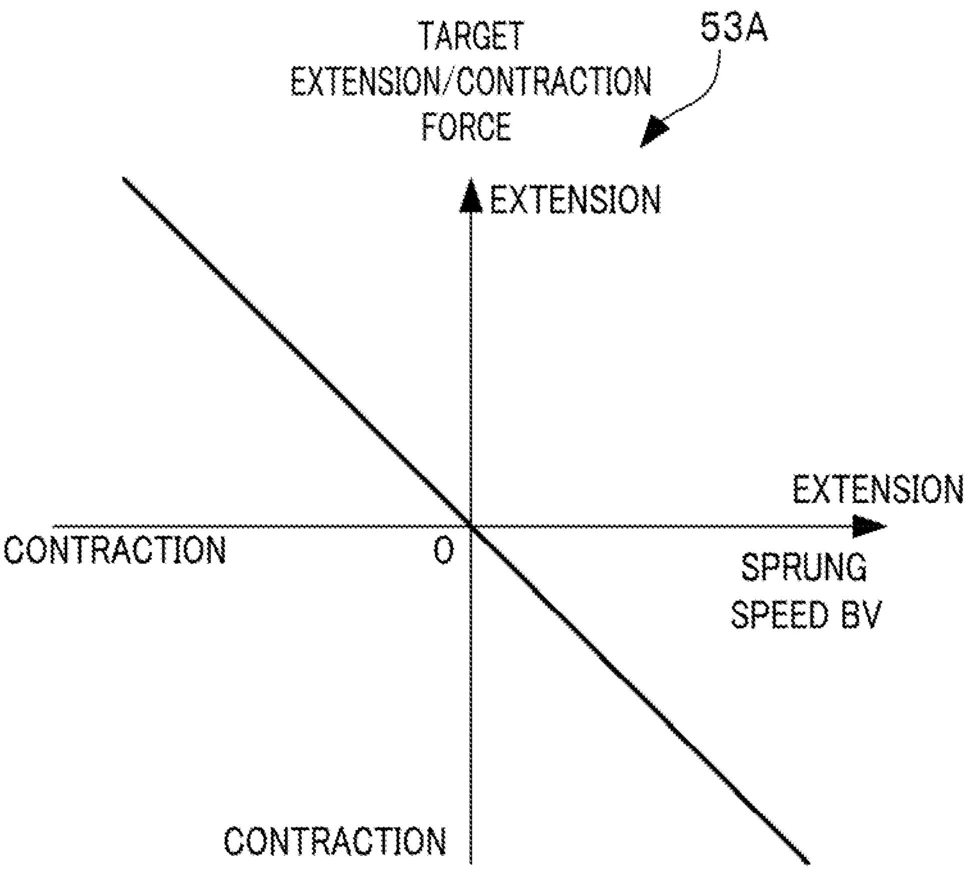
FIG. 4C is an explanatory diagram conceptually illustrating a target extension/contraction force map describing a relationship between a target extension/contraction force and a sprung speed in which the target extension/contraction force varies in response to changes of the sprung speed.

As shown in FIG. 4C, the target extension/contraction force characteristic according to the target extension/contraction force map 53A exhibits a characteristic in which the target extension/contraction force directed toward a contraction direction increases linearly as the sprung speed BV increases toward the extension direction, while the target extension/contraction force directed toward an extension direction linearly increases as the sprung speed BV increases toward the contraction direction.

Note that the target extension/contraction force characteristic according to the target extension/contraction force map 53A may be acquired by performing experiments/simulations and the like for acquiring the target extension/contraction force responsive to the sprung speed BV in order to keep a posture of the vehicle 10 in a predetermined state; and configure an appropriate characteristic value acquired by the experiments/simulations, etc. as appropriate.

The state determination part 55 provided in the driving force calculator 47A of the embodiment acquires the time-series information of the motor current via the information acquisition part 43, and the information of the integrated motor current value Iint by time-integrating the time-series information of the motor current. A range (time length) to be subjected to the time-integration may be configured to an appropriate time length (for example, three to ten minutes retroactively) in consideration of a heat capacity, heat radiation characteristics, and the like of the electric motor 31.

Further, the state determination part 55 performs a state determination on whether or not the integrated motor current value Iint exceeds a integrated current threshold Iint_th, that is, whether or not the electric motor 31 is in an excessive heat generation state, based on information such as the information of the integrated motor current value Iint acquired.

If the state determination result is that the integrated motor current value Iint exceeds the integrated current threshold Iint_th, that is, the electric motor 31 is in the excessive heat generation state, the state determination part 55 sends a control current limiting command signal indicating that the control current for achieving the driving force used for the damping and extension/contraction forces is to be limited respectively to the target damping force limiting part 52 and the target extension/contraction force limiting part 54.

Upon receiving the control current limiting command signal that is sent from the state determination part 55, the target damping force limiting part 52 calculates a value of a target damping force after limitation (target damping current) based on the value of the target damping force set by the target damping force setting part 51 and the pre/post-limitation target value maps 61A (see FIGS. 4A and 5A) according to the embodiment conceptually showing the relationship between values before and after target values of the damping force and the extension/contraction force are limited when the target damping force setting part 51 receives the control current limiting command signal. Note that the pre/post-limitation target value map 61A stores actually a target value of the damping force control current (value of target damping current) as a value equivalent to the value of the target damping force after limitation.

On the other hand, the target extension/contraction force limiting part 54, upon receiving the control current limiting command signal sent from the state determination part 55, calculates a value of a target extension/contraction force after limitation (target extension/contraction current) based on the value of the target extension/contraction force set by the target extension/contraction force setting part 53 and the pre/post-limitation target value map 61B (see FIGS. 4A and 5A) according to the embodiment. Note that the pre/post-limitation target value map 61 stores actually a target value of the extension/contraction force control current (value of target extension/contraction current) as a value equivalent to the value of the target extension/contraction force after limitation.

Here, the pre/post-limitation target value map 61A according to the embodiment, to which the target damping force limitation part 52 refers when calculating the value of the target damping force (target damping current) after limitation, and the pre/post-limitation target value map 61B according to the embodiment, to which the target extension/contraction force limitation part 54 refers when calculating the value of the target extension/contraction force (target extension/contraction current) after limitation, may be configured as commonly accessible information, or may be configured as separate information.

The following description is given of an example in which the pre/post-limitation target value maps 61A and 61B (these are collectively referred to as "pre/post-limitation target value map 61") according to the embodiment are configured as commonly accessible information.

Further, the calculation of the target damping force after limitation calculated by the target damping force limitation part 52 and the calculation of the target extension/contraction force after limitation by the target extension/contraction force limitation part 54 are performed independently. As a result, a calculation result of the target damping force after limitation calculated by the target damping force limitation part 52 and a calculation result of the target extension/contraction force after limitation by the target extension/contraction force limitation part 54 have respectively independent values.

As shown in FIG. 4A, the adder 57 provided in the driving force calculator 47A of the embodiment adds the target damping force after limitation calculated by the target damping force limitation part 52 and the target extension/contraction force after limitation calculated by the target extension/contraction force limitation part 54 to acquire the target driving force and further acquires a driving control signal for achieving the target driving force by calculation. The drive control signal, which is a calculation result acquired by the driving force calculator 47A of the embodiment, is sent to the drive controller 49.

The drive controller 49 performs drive control of each of the plurality of the electromagnetic actuators 13 separately by supplying a drive control power to the electric motor 31 provided in each of the plurality of electromagnetic actuators 13 in accordance with the drive control signal sent from the driving force calculator 47A of the embodiment.

Note that generating the drive control power to be supplied to the electric motors 31 may use, for example, an inverter control circuit as appropriate.

<Pre/Post-Limitation Target Value Map 61 According to Embodiment]>

Next, description is given of the pre/post-limitation target value map 61 according to the embodiment.

In the pre/post-limitation target value map 61 according to the embodiment, a domain TVB of pre-limitation target value (hereinbelow, sometimes abbreviated as "pre-limitation target value") includes, as indicated on a horizontal axis of FIG. 5A, the first pre-limitation target value TVb1, the second pre-limitation target value TVb2, and the third pre-limitation target value TVb3 (where TVb1>TVb2>TVb3).

The domain TVB of the pre-limitation target value includes a first domain TVB-1 from zero to a first pre-limitation target value TVb1; a second domain TVB-2 from zero to a second pre-limitation target value TVb2; and a third domain TVb-3 from zero to a third pre-limitation target value TVb3.

On the other hand, a value range TVA of a post-limitation target value includes a first post-limitation target value TVa1, a second post-limitation target value TVa2, and a third post-limitation target value TVa3 configured as TVa1>TVa2>TVa3, as shown in a vertical axis of FIG. 5A.

The value range TVA relating to the post-limitation target value includes a first value range TVA-1 from zero to the first post-limitation target value TVa1, a second value range TVA-2 from zero to the second post-limitation target value TVa2, and a third value range TVA-3 from zero to the third post-limitation target value TVa3.

The domain TVB of the pre-limitation target value and the value range TVA of-the post-limitation target value are associated with each other via a predetermined function.

Note that the first to sixth domains TVB-1 to TVB-6 relating to the pre-limitation target values may be simply referred to as the domain TVB of the pre-limitation target value when there is no need to individually specify them.

Further, the first to three value ranges TVA-1 to TVA-3 relating to the post-limitation target value may be simply referred to as the value range TVA relating to the post-limitation target value when there is no need to individually specify them.

More specifically, the first to third domains TVB-1, TVB-2, and TVB-3 (detailed below) of the pre-limitation target values are respectively associated with the first to third value ranges TVA-1, TVA-2, and TVA-3 (detailed below) of the post-limitation target value via a predetermined (commonly configured) linear function F1 along with a vertical axis of FIG. 5A.

On the other hand, the fourth to sixth domains TVB-4, TVB-5, and TVB-6 (detailed below) of the pre-limitation target values are associated respectively with the first to third post-limitation target values: fixed values TVa1, TVa2, and TVa3 (TVa1>TVa2>TVa3) via respective many-to-one functions as shown in the vertical direction of FIG. 5A.

The first domain TVB-1 is a domain relating to the target values before limitation of the damping force and the extension/contraction force in the normal state in which the electric motor 31 is not in the excessive heat generation state.

The pre-limitation target values of the damping force and the extension/contraction force belonging to the first domain TVB-1 can be mapped with one-to-one association to the post-limitation target values of the damping force and the extension/contraction force belonging to the first value range TVA-1 using the predetermined linear function F1. For example, the first pre-limitation target value TVb1 can be mapped to the first post-limitation target value TVa1.

The second domain TVB-2 is a domain relating to the pre-limitation target value of the damping force at a time of abnormality when the electric motor 31 is in the excessive heat generation state.

At the time of abnormality, the pre-limitation target value of the damping force belonging to the second domain TVB-2 is mapped with one-to-one association to the post-limitation target values of the damping force belonging to the second value range TVA-2 via a predetermined linear function F1. For example, the second pre-limitation target value TVb2 of the damping force is mapped to the second post-limitation target value TVa2 of the damping force.

The second domain TVB-3 is a domain relating to the pre-limitation target value of the damping force at a time of abnormality when the electric motor 31 is in the excessive heat generation state.

At the time of abnormality, the pre-limitation target value of the damping force belonging to the second domain TVB-3 is mapped with one-to-one association to the post-limitation target values of the damping force belonging to the second value range TVA-3 via a predetermined linear function F1. For example, the second pre-limitation target value TVb3 of the damping force is mapped to the second post-limitation target value TVa3 of the damping force.

Further, as shown on the horizontal axis of FIG. 5A, the domain TVB of the pre-limitation target value includes the fourth domain TVB-4 exceeding the first pre-limitation target value TVb1, and the fifth domain TVB-5 exceeding the second pre-limitation target value TVb2, and the sixth domain TVB-6 exceeding the third pre-limitation target value TVb3.

The fourth domain TVB-4 is, similarly to the first domain TVB-1, a domain relating to the target values before limitation of the damping force and the extension/contraction force at the normal time when the electric motor 31 is not in the excessive heat generation state. However, the fourth domain TVB-4 differs from the first domain TVB-1 in that the fourth domain TVB-4 occupies a domain relating to the pre-limitation target value having the larger target value than that of the first domain TVB-1. A combination of the first domain TVB-1 and the fourth domain TVB-4 is included by a domain relating to the target values before limitation of the damping force and the extension/contraction force in the normal time.

In the normal time, the target values before limitation of the damping force and the extension/contraction force that belong to the fourth domain TVB-4 are mapped to the first post-limitation target value TVa1 of the damping force and the extension/contraction force that are the fixed target value via the predetermined many-to-one function. The purpose of the above configuration is to limit the post-limitation target value to a levelled value irrespective of an increase in the pre-limitation target value in order to suppress an endless increase in the damping force and the extension/contraction force by setting the post-limitation target value to a fixed value: the first post-limitation target value TVa1 in the fourth domain TVB-4 having the larger pre-limitation target value than the first domain TVB-1.

The fifth domain TVB-5 is, similarly to the second domain TVB-2, a domain relating to the pre-limitation target value of the damping force when the electric motor 31 is in an abnormal state in which an excessive heat is generated. However, the fifth domain TVB-5 differs from the second domain TVB-2 in that the fifth domain TVB-5 occupies a domain relating to the pre-limitation target value having the larger target value than that of the second domain TVB-2 in the domain relating to the pre-limitation target value. A combination of the second domain TVB-2 and the fifth domain TVB-5 is included by a domain relating to the target values before limitation of the damping force in the time of abnormality.

At the time of abnormality, the target values before limitation of the damping force belonging to the fifth domain TVB-5 are mapped to the second post-limitation target value TVa2 of the damping force that are the fixed value via the predetermined many-to-one function (see the solid line portion indicating the target damping force characteristic after limitation in the pre/post-limitation target value map 61 according to the embodiment shown in FIG. 4A). The purpose of the above configuration is to limit the post-limitation target value to a levelled value irrespective of an increase in the pre-limitation target value to suppress an endless increase in the damping force by setting the post-limitation target value to a fixed value: the second post-limitation target value TVa2, in the fifth domain TVB-5 having the larger pre-limitation target value than the second domain TVB-2.

The sixth domain TVB-6 is, similarly to the third domain TVB-3, a domain relating to the pre-limitation target value of the extension/contraction force when the electric motor 31 is in an abnormal state in which an excessive heat is generated. However, the sixth domain TVB-6 differs from the third domain TVB-3 in that the sixth domain TVB-6 occupies a domain relating to the pre-limitation target value having the larger target value than that of the third domain TVB-3 in the domain relating to the pre-limitation target value. A combination of the third domain TVB-3 and the sixth domain TVB-6 is included by a domain relating to the target values before limitation of the extension/contraction force in the time of abnormality.

At the time of abnormality, the target values before limitation of the extension/contraction force that belong to the sixth domain TVB-6 are mapped to the third post-limitation target value TVa3 of the extension/contraction force that are the fixed value via the predetermined manyto-one function (see the solid line portion indicating the target extension/contraction force characteristic after limitation in the pre/post-limitation target value map 61 according to the embodiment shown in FIG. 4A. The purpose of the above configuration is to limit the post-limitation target value to a levelled value irrespective of an increase in the pre-limitation target value to suppress an endless increase in the extension/contraction force by setting the post-limitation target value to a fixed value: the third post-limitation target value TVa3 in the sixth domain TVB-6 having the larger pre-limitation target value than the third domain TVB-3.

The pre/post-limitation target value map 61 according to the embodiment, as shown in FIGS. 4A and 5A, describes how the target values before limitation of the damping force and the extension/contraction force are mapped to the post-limitation target values of the damping force and the extension/contraction force in the normal state: when the electric motor 31 is not in the excessive heat generation state and in the abnormal state: when the electric motor 31 is in an excessive heat generation state.

That is, in the normal state, the pre-limitation target values of the damping force and the extension/contraction force belonging to the first domain TVB-1 are mapped to the post-limitation target values of the damping force and the extension/contraction force belonging to the first value range TVA-1 using the predetermined linear function F1; and the pre-limitation target values of the damping force and the extension/contraction force belonging to the fourth domain TVB-4 are mapped to the fixed first post-limitation target values TVa1 of the damping force and the extension/contraction force through a predetermined many-to-one function.

The operation at the time of abnormality, which is paired with the normal time, is described separately about the damping force and the extension/contraction force.

First, about the damping force at the time of abnormality, description is given of how the pre-limitation target value is mapped to the post-limitation target value.

At the time of abnormality, the pre-limitation target value of the damping force belonging to the second domain TVB-2 is mapped to the post-limitation target value of the damping force belonging to the second value range TVA-2 through the predetermined linear function F1, and the pre-limitation target value of the damping force belonging to the fifth domain TVB-5 is mapped to the fixed post-limitation target value TVa2 of the damping force through the predetermined many-to-one function.

Next, about the extension/contraction force at the time of abnormality, description is given of how the post-limitation target value is mapped to the pre-limitation target value.

At the time of abnormality, the pre-limitation target value of the extension/contraction force belonging to the third domain TVB-3 is mapped to a post-limitation target value of the extension/contraction force belonging to the third value range TVA-3 through a predetermined linear function F1; and the pre-limitation target value of the extension/contraction force belonging to the sixth domain TVB-6 is mapped to a fixed post-limitation target value TVa3 of the extension/contraction force through a predetermined many-to-one function.

In another aspect of view, FIG. 5A shows that the pre/post-limitation target value map 61 according to the embodiment is configured so that the post-limitation target value of the extension/contraction force at the time of abnormality (extension/contraction current limitation threshold: the third post-limitation target value TVa3) is smaller than the post-limitation target value of the damping force at the time of the abnormality (damping current limitation threshold: the second post-limitation target value TVa2).

<Pre/Post-Limitation Target Value Map 63 of Modification>

Next, description is given of the pre/post-limitation target value map 63 according to a modification with reference to FIG. 5B.

FIG. 5B is an explanatory diagram of a pre/post-limitation target value map 63 according to a modification that conceptually illustrates a relationship between the target values before and after limitation of the damping force and the extension/contraction force when receiving the control current limiting command signal.

The pre/post-limitation target value map 61 according to the embodiment shown in FIG. 5A and the pre/post-limitation target value map 63 according to the modification shown in FIG. 5B have many common characteristics.

Therefore, description is given of the pre/post-limitation target value map 63 according to the modification by focusing on differences between the pre/post-limitation target value map 61 according to the embodiment and the pre/post-limitation target value map 63 according to the modification and by describing mainly the differences.

In the pre/post-limitation target value map 63 according to the modification, a domain TVB of the pre-limitation target value has the eleventh pre-limitation target value TVb11, the twelfth pre-limitation target value TVb12, and the thirteenth pre-limitation target value TVb13 respectively configured so that their values are as TVb11<TVb12<TVb13.

The domain TVB of the pre-limitation target value includes an eleventh domain TVB-11 from zero to the eleventh pre-limitation target value TVb11, a twelfth domain TVB-12 from zero to the twelfth pre-limitation target value TVb12, and a thirteenth domain TVB-13 from zero to the thirteenth pre-limitation target value TVb13.

On the other hand, the value range TVA relating to the post-limitation target value has an eleventh post-limitation target value TVa11, a twelfth post-limitation target value TVa12, and a thirteenth post-limitation target value TVa13 respectively configured so that their values are as TVa11>TVa12>TVa13, as indicated on the vertical axis in FIG. 5B.

The value range TVA relating to the post-limitation target value includes an eleventh value range TVA-11 from zero to the eleventh post-limitation target value TVa11, a twelfth value range TVA-12 from zero to the twelfth post-limitation target value TVa12, and a thirteenth value range TVA-13 from zero to the thirteenth post-limitation target value TVa13.

The domain TVB of the pre-limitation target value and the range TVA of the post-limitation target value are associated with each other respectively through predetermined different functions F11, F12, and F13.

A difference of the pre/post-limitation target value map 63 according to the modification from the pre/post-limitation target value map 61 according to the embodiment is that the domain TVB of the pre-limitation target value and the value range TVA relating to the post-limitation target value are associated with each other respectively through the predetermined different functions F11, F12, and F13.

More specifically, the eleventh to thirteenth domains TVB-11, TVB-12, and TVB-13 relating to the pre-limitation target value are mapped respectively to the eleventh to thirteenth value ranges TVA-11, TVA-12, and TVA-13 of the post-limitation target value respectively through the different predetermined functions F11, F12, and F13 along the vertical axis of FIG. 5B.

The eleventh domain TVB-11 is a domain relating to the pre-limitation target values of the damping force and the extension/contraction force at the normal time when the electric motor 31 is not in the excessive heat generation state.

The pre-limitation target values of the damping force and the extension/contraction force belonging to the eleventh domain TVB-11 are mapped with one-to-one association to the post-limitation target values of the damping force and the extension/contraction force belonging to the eleventh value range TVA-11 using the predetermined linear function F11. For example, the eleventh pre-limitation target value TVb11 is mapped to the eleventh post-limitation target value TVa11.

The twelfth domain TVB-12 is a domain relating to the pre-limitation target value of the damping force at the time of abnormality when the electric motor 31 is in the excessive heat generation state.

In the time of abnormality, the pre-limitation target value of the damping force belonging to the twelfth domain TVB-12 is mapped through one-to-one association to the post-limitation target value of the damping force belonging to the twelfth value range TVA-12 through the predetermined linear function F12.

The predetermined linear function F12 is configured to have a gentler slope than the predetermined linear function F11. For example, the twelfth pre-limitation target value TVb12 of the damping force is mapped to the twelfth post-limitation target value TVa12 of the damping force, which TVa12 is smaller than TVa11.

The thirteenth domain TVB-13 is a domain relating to the pre-limitation target value of the extension/contraction force at the time of abnormality when the electric motor 31 is in the excessive heat generation state.

In the time of abnormality, the pre-limitation target value of the extension/contraction force belonging to the thirteenth domain TVB-13 is mapped through one-to-one association to the post-limitation target value of the extension/contraction force belonging to the thirteenth value range TVA-13 through the predetermined linear function F13.

The predetermined linear function F13 is configured to have a gentler slope than the predetermined linear function F12. For example, the thirteenth pre-limitation target value TVb13 of the extension/contraction force is mapped to the thirteenth post-limitation target value TVa13 of the extension/contraction force, which TVa13 is smaller than TVa12.

In short, the pre/post-limitation target value map 63 according to the modification differs from the pre/post-limitation target value map 61 in that slopes of the linear functions used to map the pre-limitation target value to the post-limitation target value are gentler (F11>F12>F13) as an operation mode of the electric motor 31 shifts from the damping and extension/contraction control in the normal time, through the damping control at the time of abnormality, and to the extension/contraction control at the time of abnormality in a region of the domain TVB of the pre-limitation target value in which pre-limitation target values at the respective operation modes are smaller than the respective pre-limitation target values TVb11, TVb12, and TVb13.

Note that, the pre/post-limitation target value map 63 according to the modification has the domains occupying a larger pre-limitation target value respectively than the eleventh domain TVB-11, the twelfth domain TVB-12, and the thirteenth domain TVB-13 are mapped to respective fixed values (the eleventh post-limitation target value TVa11, the twelfth post-limitation target value TVa12, and the thirteenth post-limitation target value TVa13), to suppress an endless increase in the damping force and the extension/contraction force by setting the post-limitation target value to a fixed levelled value. This configuration is the same as the pre/post-limitation target value map 61 according to the embodiment.

Note that, the pre/post-limitation target value map 63 according to the modification may be configured to have domain portions having the larger pre-limitation target value respectively than the eleventh domain TVB-11, the twelfth domain TVB-12, and the thirteenth domain TVB-13 mapped to a common fixed value (for example, the eleventh post-limitation target value TVa11) as the post-limitation target value, so that the post-limitation target values are levelled off irrespective of increases of the pre-limitation target values in the respective domains in order to suppress endless increases of the damping force and the extension/contraction force.

Note that the pre/post-limitation target value map 63 according to the modification has the post-limitation target value of the extension/contraction force at the time of abnormality (the extension/contraction current limitation threshold, i.e., the thirteenth post-limitation target value TVa13) set to a value smaller than the post-limitation target value of the damping force at the time of abnormality (the damping current limitation threshold, i.e., the twelfth post-limitation target value TVa12), similarly to the pre/post-limitation target value map 61 according to the embodiment.

<Operation of Electrically Powered Suspension System 11 According to Embodiment>

Figure 6:
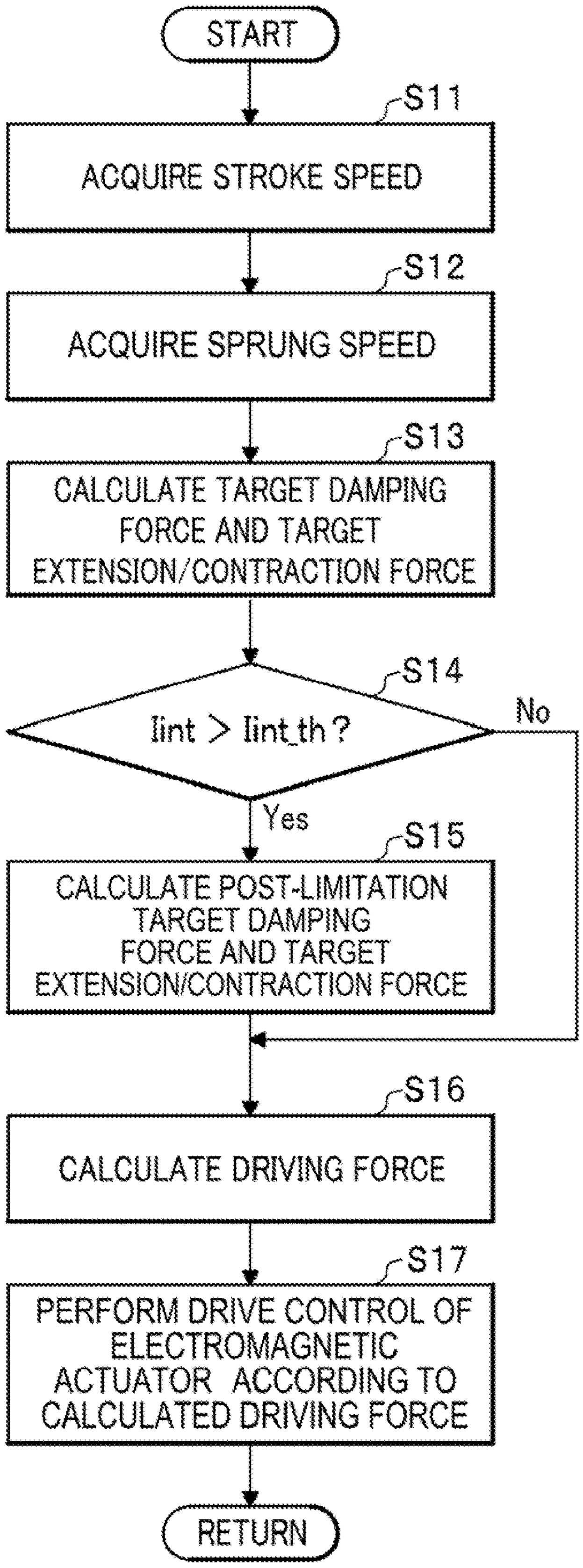
FIG. 6 is a flowchart describing an operation of the electrically powered suspension system according to the embodiment of the present invention.

Next, description is given of an operation of the electrically powered suspension system 11 according to the embodiment of the present invention with reference to FIG. 6, which is a flowchart illustrating the operation of the electrically powered suspension system 11 according to the embodiment of the present invention.

In step S11: "Acquire stroke speed" shown in FIG. 6, the information acquisition part 43 of the ECU 15 receives a rotation angle signal of the electric motor 31 detected by the resolver 37 as time-series information on a stroke position, and time-differentiates this time-series information to acquire information on a stroke speed SV. The information on the stroke speed SV acquired in this manner is sent to the driving force calculator 47.

In step S12: "Acquire sprung speed", the information acquisition part 43 of the ECU 15 acquires time-series information on sprung acceleration detected by the sprung acceleration sensor 40 and time-integrates the time-series information on the sprung acceleration to acquire information on a sprung speed BV. The information on the sprung speed BV acquired in this way is sent to the driving force calculator 47.

In step S13: "Calculate target damping force and target extension/contraction force", the target damping force setting part 51 provided in the driving force calculator 47 of the ECU 15 determines a value of a target damping force responsive to the stroke speed SV based on the information on the stroke speed SV acquired in step S11 and a target damping force map 51A (see FIG. 4B) conceptually representing a relationship (target damping force characteristic) between the stroke speed SV and a target damping force that varies responding to variations of the stroke speed SV.

Further, the target extension/contraction force setting part 53 provided in the driving force calculator 47 of the ECU 15 determines a value of the target extension/contraction force responsive to the sprung speed BV based on the information on the sprung speed BV acquired in step S12 and a target extension/contraction force map conceptually representing a relationship (target extension/contraction force characteristics) between the sprung speed BV and the target extension/contraction force that varies in response to the variations of the sprung speed BV.

In step S14, the state determination part 55 included in the driving force calculator 47 of the ECU 15, first calculates a integrated motor current value Iint by time-integrating time-series information on the motor current; next, performs a state determination as to whether or not the integrated motor current value Iint exceeds the integrated current threshold Iint_th, that is, whether or not the electric motor 31 is in the excessive heat generation state, on a basis of the information on the calculated integrated motor current value Iint, and the like.

When the state determination in step S14 results in a determination that the electric motor 31 is not in the excessive heat generation state ("No" in step S14), the ECU 15 makes the processing flow jump to step S161.

On the other hand, when the state determination in step S14 results in a determination that the electric motor 31 is in the excessive heat generation state ("Yes" in step S14), the state determination part 55 included in the driving force calculator 47 of the ECU 15 sends a setting-permission signal indicating a permission of the setting according to setting information on a control mode respectively to the target damping force limitation part 52 and the target extension/contraction force limitation part 54.

In step S15, the target damping force limiting part 52 included in the driving force calculator 47 of the ECU 15 calculates a value of the post-limitation target damping force on a basis of the value of the target damping force set in the step S13 and the pre/post-limitation target value map 61 according to the embodiment.

Further, the target extension/contraction force limiting part 54 included in the driving force calculator 47 of the ECU 15 calculates a post-limitation target value of the extension/contraction force on a basis of the value of the target extension/contraction force determined in step S13 and the pre/post-limitation target value map 61 according to the embodiment.

In step S16: "Calculate driving force", if the state determination in step S14 results in the determination that the electric motor 31 is in the excessive heat generation state, the adder 57 included in the driving force calculator 47 of the ECU 15 calculates a target driving force by adding the post-limitation target damping force calculated by the target damping force limitation part 52 and the target extension/contraction force calculated by the target extension/contraction force limitation part 54 both in the step S15; and calculates a driving control signal for achieving the target driving force.

However, when the state determination in step S14 results in the determination that the electric motor 31 is not in the excessive heat generation state, the adder 57 included in the driving force calculator 47 of the ECU 15 acquires a target driving force by adding the target damping force calculated by the target damping force setting part 51 and the target extension/contraction force calculated by the target extension/contraction force limitation part 53 both in the step S13; and calculates a drive control signal for achieving the target driving force.

In step S17, the drive controller 49 of the ECU 15 supplies drive control power to the electric motor 31 provided in each of the plurality of electromagnetic actuators 13 in accordance with the drive control signal calculated in the step S16, so as to perform the drive control of the plurality of electromagnetic actuators 13.

<Internal Configuration of Driving Force Calculator According to First Modification>

Figure 7A:
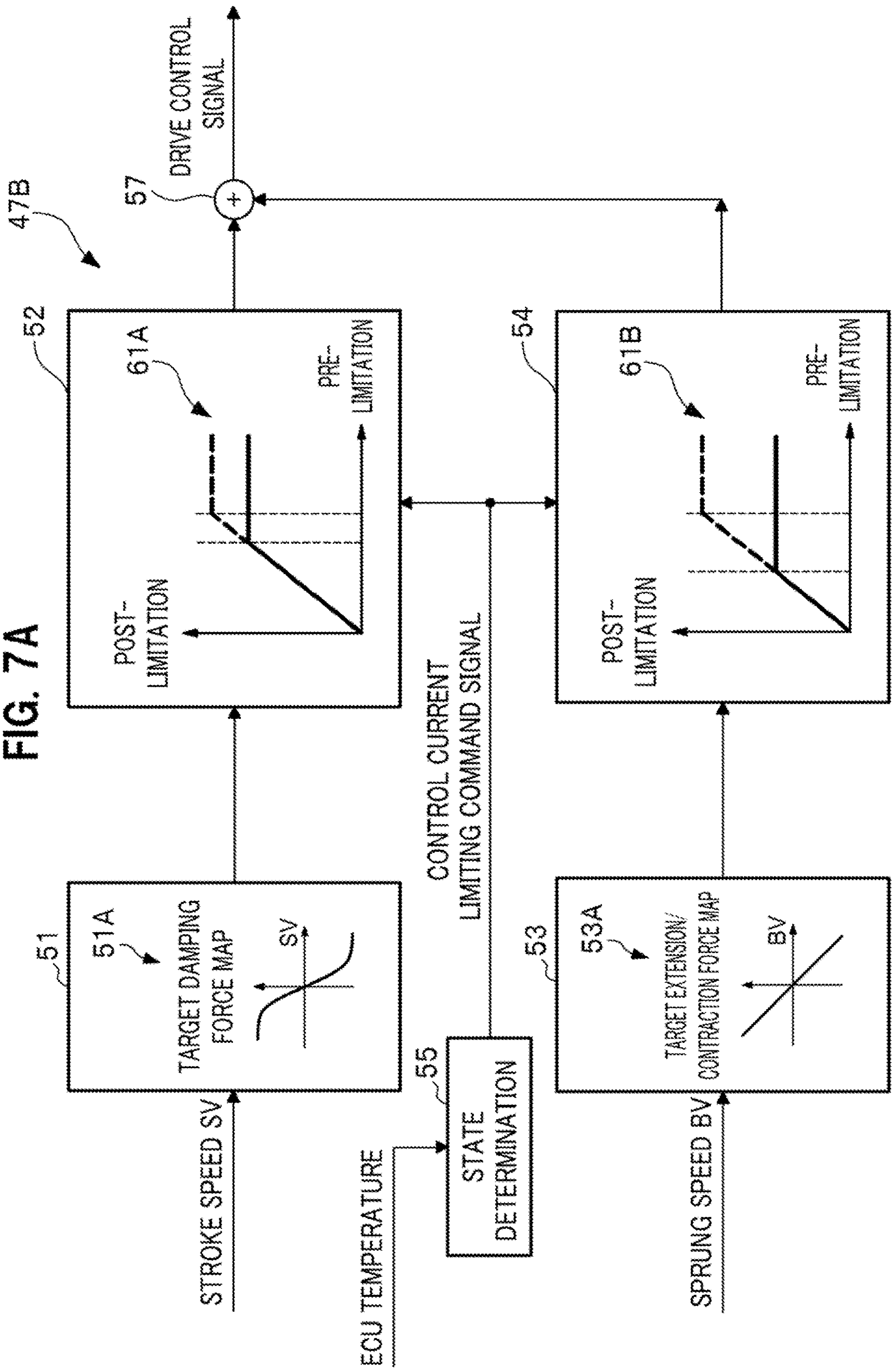
FIG. 7A is a block diagram conceptually showing an internal configuration of a first modification of the driving force calculator included in the ECU of the electrically powered suspension system.

Next, description is given of an internal configuration of a driving force calculator 47B according to first modification included in the ECU 15 of the electrically powered suspension system 11 with reference to FIG. 7A.

FIG. 7A is a block diagram conceptually illustrating the internal configuration of the driving force calculator 47B according to a first modification included in the ECU 15 of the electrically powered suspension system 11.

The driving force calculator 47A of the embodiment illustrated in FIG. 4A and the driving force calculator 47B according to the first modification illustrated in FIG. 7A have many components common to both.

Accordingly, description is given, which is focused mainly on differences between the driving force calculator 47A of the embodiment and the driving force calculator 47B according to the first modification by focusing on them, which description substitutes for an explanation on the driving force calculator 47B according to the first modification.

The driving force calculator 47B according to the first modification differs from the driving force calculator 47A of the embodiment in that the driving force calculator 47B determines whether or not the electric motor 31 is in the excessive heat generation state on a basis of information such as ECU temperature Te, instead of the information of the integrated motor current value Iint (used in the embodiment) acquired by time-integrating the time-series information on the motor current.

The state determination part 55 included in the driving force calculator 47B according to the first modification acquires the information on the ECU temperature Te through the information acquisition part 43. The information on the ECU temperature Te, which varies every moment in response to a load state (drive current) of the electric motor 31, may be acquired at a predetermined cycle and used as appropriate.

Further, the state determination part 55 performs a state determination of whether or not the ECU temperature value Te exceeds the ECU temperature threshold Te_th, that is, whether or not the electric motor 31 is in the excessive heat generation state.

If the state of the determination results in a determination that the ECU temperature Te exceeds the ECU temperature threshold Te_th, that is, the electric motor 31 is in the excessive heat generation, the state determination part 55 is sends a control current limiting command signal indicating to limit the control current for achieving the driving force relating to the damping force and the extension/contraction force, respectively to the target damping force limiting part 52 and the target extension/contraction force limiting part 54.

The subsequent operation is the same as that of the driving force calculator 47A of the embodiment.

<Internal Configuration of Driving Force Calculator of Second Modification>

Figure 7B:
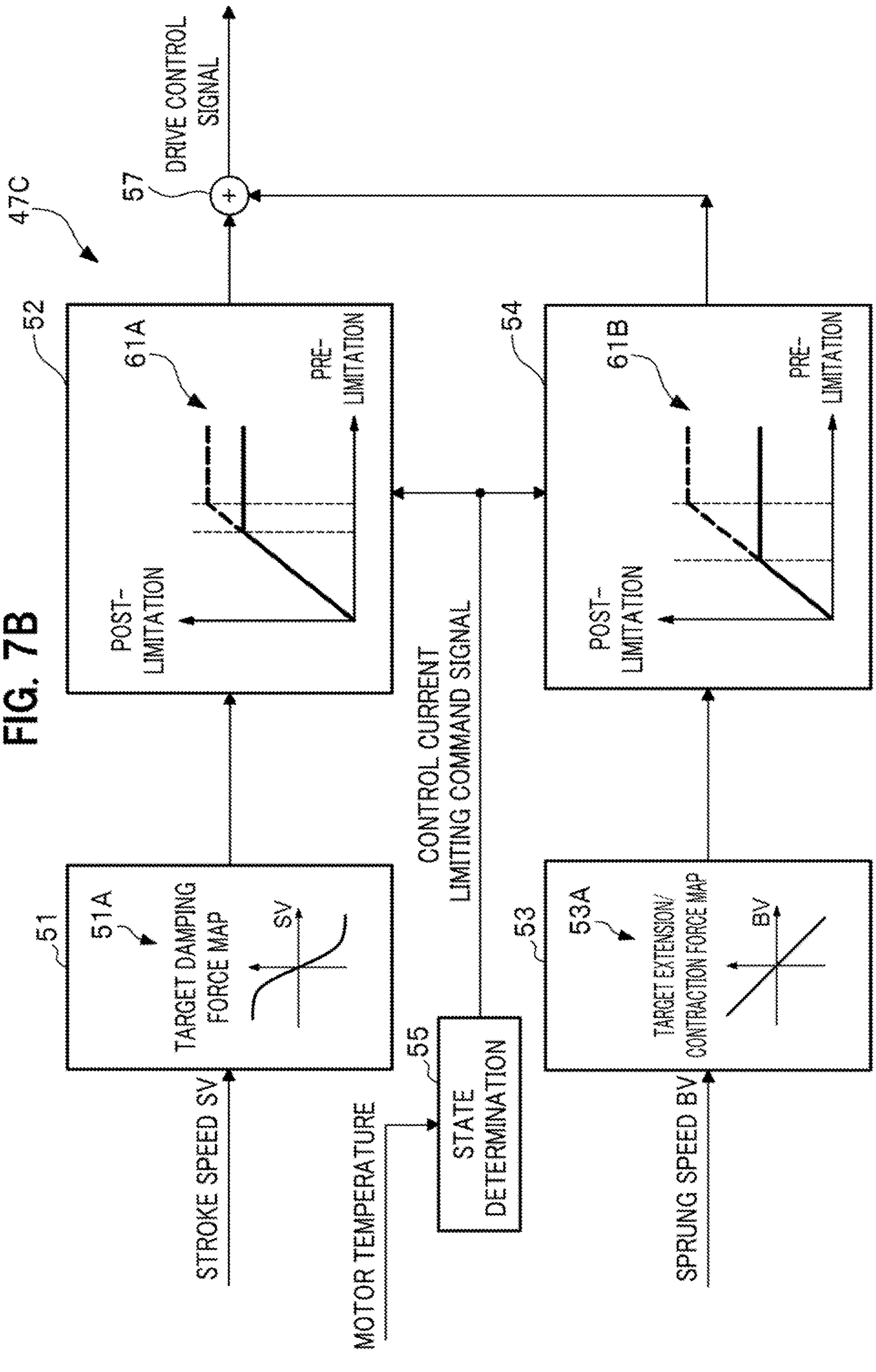
FIG. 7B is a block diagram conceptually showing an internal configuration of a second modification of the driving force calculator included in the ECU of the electrically powered suspension system.

Next, description is given of an internal configuration of a driving force calculator 47C according to second modification provided in the ECU 15 of the electrically powered suspension system 11 with reference to FIG. 7B.

FIG. 7B is a block diagram conceptually illustrating an internal configuration of the driving force calculator 47C according to the second modification provided in the ECU 15 of the electrically powered suspension system 11.

The driving force calculator 47A of the embodiment illustrated in FIG. 4A and the driving force calculator 47C according to the second modification illustrated in FIG. 7C have many components common to both.

Accordingly, a description is given, which is focused mainly on differences between the driving force calculator 47A of the embodiment and the driving force calculator 47C according to the second modification, and which description substitutes for an explanation on the driving force calculator 47C according to the second modification.

The driving force calculator 47C according to the second modification is different from the driving force calculator 47A of the embodiment in that the driving force calculator 47C performs a state determination of whether or not the electric motor 31 is in the excessive heat generation state on a basis of information such as a motor temperature Tm instead of the information of the integrated motor current value Iint (used in the embodiment) acquired by time-integrating the time-series information of the motor current.

The state determination part 55 included in the driving force calculator 47C according to the second modification acquires the information on the motor temperature Tm via the information acquisition part 43. The information on the motor temperature Tm, which varies every moment in response to a load state (drive current) of the electric motor 31, may be acquired at a predetermined cycle and used as appropriate.

Further, the state determination part 55 performs a state determination of whether or not the motor temperature Tm exceeds the motor temperature threshold Tm_th, that is, whether or not the electric motor 31 is in the excessive heat generation state.

If the state of the determination results in a determination that the Motor temperature Tm exceeds the motor temperature threshold Tm_th, that is, the electric motor 31 is in the excessive heat generation, the state determination part 55 sends a control current limiting command signal indicating to limit the control current for achieving the driving force relating to the damping force and the extension/contraction force, respectively to the target damping force limiting part 52 and the target extension/contraction force limiting part 54.

The subsequent operation is the same as that of the driving force calculator 47A of the embodiment.

<Features of Electrically Powered Suspension System 11 of Embodiment>

Next, description is given of features of the electrically powered suspension system 11 according to the embodiment (including an example, and modifications 1 and 2) of the present invention.

The first feature is that the damping current limitation threshold and the extension/contraction current limitation threshold (when the electric motor 31 is in an excessive heat generation state) are configured individually in consideration of conditions such that they are different in priority on riding comfort and driving stability of the vehicle 10 and an energization time for the damping control and the extension/contraction control.

First, description is given of the priority regarding the riding comfort and the driving stability of the vehicle 10.

The time of abnormality (when the electric motor 31 is in an excessive heat generation state) may be supposed to be, for example, a case in which requests frequently occur to generate the damping force and the extension/contraction force relating to the electrically powered suspension system 11 when the vehicle 10 is traveling on a rough unpaved road.

In the case described above, when the vehicle 10 is traveling on the rough unpaved road, it is a principle to give priority to the driving stability of the vehicle 10 more than the riding comfort thereof, because there is a higher demand for stabilizing a behavior of the vehicle 10 as compared with a case in which the vehicle 10 is traveling on a maintained and paved road. This means that the damping control mainly relating to a steering stability is performed with priority over the extension/contraction control mainly relating to the riding comfort of the vehicle 10.

Next, description is given of a situation in which a difference occurs in the energization time for the damping control and the extension/contraction control.

Generally, a frequency of a vibration wave to be controlled by the damping control is prone to be higher than a frequency of a vibration wave to be controlled by the extension/contraction control. This results in a tendency in which an energization time for the damping control that is an energization time required for the damping control of the vibration wave in a predetermined unit cycle period is shorter than an energization time for the extension/contraction control of the vibration wave in a predetermined unit cycle (vibration wave to be controlled by damping control is subsided in a shorter time than vibration wave to be controlled by extension/contraction control).

Conversely, the frequency of the vibration wave to be controlled by the extension/contraction control tends to be lower than the frequency of the vibration wave to be controlled by the damping control. This results in a tendency in which the energization time for the extension/contraction control of the vibration wave in the predetermined unit cycle is longer than the energization time for the damping control that is the energization time required for the damping control of the vibration wave in the predetermined unit cycle period (vibration wave to be controlled by extension/contraction control needs a longer time than vibration wave to be controlled by damping control).

As described above, the energization time for the damping control of the vibration wave per unit cycle tends to be shorter (settled in a shorter time) than the energization time for the extension/contraction control of the vibration wave per unit cycle. That is, there is a substantial difference in the energization time for the damping control and the extension/contraction control of the vibration wave per unit cycle.

This means that a reasonable design is to assign different length of times respectively to the energization time for the damping control and the energization time for the extension/contraction control in the time of abnormality in which the electric motor 31 generates excessive heat, when considering the current limitation timing (operation limitation timing) for the damping control and the extension/contraction control.

Therefore, the electrically powered suspension system 11 according to the embodiment of the present invention is configured to have a configuration in which settings are separately assigned to the damping current limitation threshold and the extension/contraction current limitation threshold, considering the priority on the riding comfort and steering stability of the vehicle 10, and a condition such as the substantial difference in the energization times for performing the damping control and the extension/contraction control.

Here, the damping current limitation threshold is a current limitation threshold that is a guide value for limiting the drive current (damping control current) of the electric motor 31 when performing the damping control at the time of abnormality. The damping current limitation threshold corresponds to the second post-limitation target value TVa2.

In addition, the extension/contraction current limitation threshold is a current limitation threshold that is a guide value for limiting the drive current (extension/contraction control current) of the electric motor 31 when performing the extension/contraction control at the time of abnormality. The extension/contraction current limitation threshold corresponds to the third post-limitation target value TVa3.

As shown in FIG. 5A, the second feature is that the extension/contraction current limitation threshold (third post-limitation target value TVa3) is set to a value smaller than the damping current limitation threshold (second post-limitation target value TVa2), that is, TVa3<TVa2.

As described above, the energization time for the extension/contraction control of the vibration wave per unit cycle tends to be longer than the energization time for the damping control of the vibration wave per unit cycle, which means that an amount of work (heat quantity) for the extension/contraction control of the vibration wave per unit cycle tends to be larger than an amount of work (heat quantity) for the damping control of the vibration wave per unit cycle.

This second feature allows to give priority to performing the current limitation of the extension/contraction control that involves the riding comfort of the vehicle 10 and tends to generate a larger amount of heat than the damping control, over the current limitation of the damping control, and at the same time, and to make the current limitation of the damping control (involving suppression of the unsprung vibration) difficult to start and thereby to achieve the vibration control of the vehicle 10 without disturbing a behavior of the vehicle 10 and without impairing the riding comfort of the vehicle 10 as much as possible even if the electric motor 31 provided in the electromagnetic actuator 13 is in an excessive heat generation state.

<Effects of Electrically Powered Suspension System 11 of Embodiment>

The electrically powered suspension system 11 according to the first aspect includes the electromagnetic actuator 13 including the electric motor 31 generating the driving force relating to the vibration damping and the extension/contraction; a driving force calculator (target current calculator) 47 calculating respectively a target damping current for generating a target driving force relating to the vibration damping and a target extension/contraction current for generating a target driving force relating to the extension/contraction; and a drive controller 49 performing the drive control of the electric motor using a drive current based on the target damping current and the target extension/contraction current.

The drive controller 49 performs the drive control of the electric motor 31 using the drive current of the electric motor 31 limited not to exceed a preconfigured current limitation threshold.

The current limitation threshold includes an damping current limitation threshold for the target damping current (second post-limitation target value TVa2) and the extension/contraction current limitation threshold for the target extension/contraction current (third post-limitation target value TVa3).

The damping current limitation threshold (second post-limitation target value TVa2) and the extension/contraction current limitation threshold (third post-limitation target value TVa3) are individually configured.

In the electrically powered suspension system 11 according to the first aspect, the drive controller 49 controls the electric motor 31 using the drive current limited so that the drive current of the electric motor 31 does not exceed a preset current limitation threshold. Drive control is performed.

In the embodiment of the present invention, properties for the drive current of the electric motor 31 corresponds respectively to the integrated motor current value Iint in the embodiment, the ECU temperature value Te in the first modification, and a motor temperature value Tm in the second modification.

In the above correspondence, properties for the current limitation threshold pre-configured to limit the drive current of the electric motor 31 corresponds respectively to the integrated current threshold Iint_th in the embodiment, the ECU temperature threshold Te_th in the first modification, the motor temperature threshold Tm_th in the second modification.

In other words, the electrically powered suspension system 11 according to the first aspect determines that the electric motor 31 is in an excessive heat generation state when the drive current of the electric motor 31 (integrated motor current value Iint in the embodiment, ECU temperature value Te in the first modification, motor temperature value Tm in the second modification) exceeds the preset current limitation threshold (integrated current threshold Iint_th in the embodiment, ECU threshold temperature Te_th in the first modification, motor temperature threshold Tm_th in the second modification).

The current limitation threshold includes the damping current limitation threshold for the target damping current (second post-limitation target value TVa2) and the extension/contraction current limitation threshold for the target extension/contraction current (third post-limitation target value TVa3). This configuration is based on a fact that the damping control and the extension/contraction control are simultaneously performed using the drive current acquired by adding the target damping current and the target extension/contraction current.

The damping current limitation threshold (second post-limitation target value TVa2) and the extension/contraction current limitation threshold (third post-limitation target value TVa3) are individually determined, for example, according to the priority on the riding comfort and steering stability of the vehicle 10. This means, for example, that the damping control involving mainly the steering stability is performed with priority over the extension/contraction control mainly involving the riding comfort of the vehicle 10.

The electrically powered suspension system 11 according to the first aspect performs the damping control mainly involving the steering stability with priority over the extension/contraction control mainly involving the riding comfort of the vehicle 10 when determining that the electric motor 31 is in the excessive heat generation state, and therefore is able to achieve the accurate vibration control of the vehicle 10 without disturbing the behavior of the vehicle 10 and without impairing the riding comfort of the vehicle 10 as much as possible even when the electric motor 31 provided in the electromagnetic actuator 13 is in the excessive heat generation state.

Further, the electrically powered suspension system 11 according to the second aspect is the electrically powered suspension system 11 according to the first aspect, wherein the extension/contraction current limitation threshold (the third post-limitation target value TVa3) is set to a value smaller than a damping current limitation threshold (the second post-limitation target value TVa2).

As described above, the energization time for the extension/contraction control of the vibration wave per unit cycle tends to be longer than the energization time for the damping control of the vibration wave per unit cycle. In other words, the amount of work (heat quantity) for the extension/ contraction control of the vibration wave per unit cycle tends to be larger than the amount of work (heat quantity) for the damping control of the vibration wave per unit cycle.

The electrically powered suspension system 11 according to the second aspect is able to give priority to performing the current limitation of the extension/contraction control that involves the riding comfort of the vehicle 10 and tends to generate a larger amount of heat than the damping control over the current limitation of the damping control, and at the same time, to make the current limitation of the damping control (involving suppression of the unsprung vibration) difficult to start and thereby can achieve the accurate vibration control of the vehicle 10 without disturbing a behavior of the vehicle 10 and without impairing the riding comfort of the vehicle 10 as much as possible even if the electric motor 31 provided in the electromagnetic actuator 13 is in the excessive heat generation state.

The electrically powered suspension system 11 according to the third aspect is the electrically powered suspension system 11 according to the first or second aspects, wherein the damping current limitation threshold (the second post-limitation target value TVa2) and the extension/contraction current limitation threshold (the third post-limitation target values TVa3) each is set on a basis of the current correlation value correlating with the drive current of the electric motor 31.

Here, the current correlation value correlated with the drive current of the electric motor 31 is a property that naturally includes the drive current itself of the electric motor 31, and further comprehensively includes current correlation values that can give an accurate estimate about the heat generation state of the electric motor 31, such as a current correlation value of the electric motor 31 converted from a temperature around a substrate of the ECU 15 that performs the drive control of the electromagnetic actuator 13; and a current correlation value of the electric motor 31 converted from a temperature around a housing of the electric motor 31.

The electrically powered suspension system 11 according to the third aspect may configure each of the damping current limitation threshold and the extension/contraction current limitation threshold on a basis of the current correlation values correlating with the driving current of the electric motor 31, and therefore allows to clarify a configuration guideline of the damping current limitation threshold and the extension/contraction current limitation threshold to facilitate implementation of the present invention.

Further, an electrically powered suspension system 11 according to the fourth aspect is the electrically powered suspension system 11 including any one of the first to third aspects, and further includes an information acquisition part 43 that acquires information on a temperature Te of the ECU (drive control unit) 15, wherein each of the damping current limitation threshold (the second post-limitation target value TVa2) and the extension/contraction current limitation threshold (the third post-limitation target value TVa3) is set on a basis of the temperature Te of the ECU 15.

The electrically powered suspension system 11 according to the fourth aspect may configure each of the damping current limitation threshold and the extension/contraction current limitation threshold on a basis of the temperature Te of the ECU 15, and therefore allows to make a clearer configuration guideline of the damping current limitation threshold and the extension/contraction current limitation threshold to facilitate implementation of the present invention more than the electrically powered suspension system 11 according to the third aspect.

Further, the electrically powered suspension system 11 according to the fifth aspect is the electrically powered suspension system 11 according to any one of the first to third aspects, and further including an information acquisition part 43 that acquires information on the temperature Tm of the electric motor 31, wherein each of the damping current limitation threshold (the second post-limitation target value TVa2) and the extension/contraction current limitation threshold (the third post-limitation target value TVa3) is configured on a basis of the temperature Tm of the electric motor 31.

The electrically powered suspension system 11 according to the fifth aspect may configure each of the damping current limitation threshold and the extension/contraction current limitation threshold on a basis of the temperature Tm of the electric motor 31, and therefore allows to make a clearer configuration guideline of the damping current limitation threshold and the extension/contraction current limitation threshold to facilitate implementation of the present invention more than the electrically powered suspension system 11 according to the third aspect.

Further, the electrically powered suspension system 11 according to the sixth aspect is the electrically powered suspension system 11 including any of the first to third aspects, wherein the damping current limitation threshold (the second post-limitation target value TVa2) and the extension/contraction current limitation threshold (the third post-limitation target value TVa3) are independently configured in consideration of at least the priority on the riding comfort and the driving stability of the vehicle 10.

This means that the damping control mainly relating to the steering stability is performed with priority over the extension/contraction control mainly relating to the riding comfort of the vehicle 10.

The electrically powered suspension system 11 according to the sixth aspect performs the damping control mainly involving the steering stability with priority over the extension/contraction control mainly involving the riding comfort of the vehicle 10 when determining that the electric motor 31 is in the excessive heat generation state, and therefore is able to achieve the accurate vibration control of the vehicle 10 without disturbing the behavior of the vehicle 10 and without impairing the riding comfort of the vehicle 10 as much as possible even when the electric motor 31 provided in the electromagnetic actuator 13 is in the excessive heat generation state, similarly to the electrically powered suspension system 11 according to the first aspect.

OTHER EMBODIMENTS

The embodiment and the plurality of modifications described above show examples for implementations of the present invention. Therefore, the technical scope of the present invention should not be construed to be limited to these embodiment and modifications. The present invention can be implemented in various embodiments without departing from the gist or the main scope of the present invention.

In addition, the description is given of the embodiment of the extension/contraction control of the electromagnetic actuator 13 in the electrically powered suspension system 11 according to the embodiment of the present invention, by exemplifying the control performed using the skyhook control that suppresses the vertical vibration of the vehicle body on the basis of the sprung speed BV, but the present invention is not limited to this embodiment.

The present invention may be applied, for example, on a control for suppressing roll vibration of the vehicle body based on the roll angular velocity of the vehicle body and a control for suppressing pitch vibration of the vehicle body based on the pitch angular velocity of the vehicle body, as another embodiment of the extension/contraction control of the electromagnetic actuator 13.

Further, the electrically powered suspension system 11 according to the embodiment is described in the embodiment that arranges the total of four electromagnetic actuators 13 on both the front wheels (front right wheel and front left wheel) and the rear wheels (rear right wheel and rear left wheel). However, the present invention is not limited to this specific embodiment. For example, the total of two electromagnetic actuators 13 may be arranged in either one of the front wheels and the rear wheels.

Finally, the electrically powered suspension system 11 according to the embodiment is described such that the drive controller 49 performs independent drive control of each of the plurality of electromagnetic actuators 13. To be more specific, the drive controller 49 may perform independent drive control of each of the electromagnetic actuators 13 respectively provided in the four wheels for each of the wheels. Further, the drive controller 49 may performs independent drive control of the electromagnetic actuators 13 respectively provided for the four wheels, separately for the front wheels and for the rear wheels, or separately for the right wheels and the left wheels.

What is claimed is:

1. An electrically powered suspension system comprising:

an electromagnetic actuator including an electric motor generating a driving force used for vibration damping and extension/contraction;

a target current calculator calculating respectively a target damping current for generating a target driving force used for the vibration damping and a target extension/contraction current for generating a target driving force used for the extension/contraction; and a drive control unit performing a drive control of the electric motor using a drive current based on the target damping current and the target extension/contraction current, wherein the drive control unit performs the drive control of the electric motor using the drive current for the electric motor, the drive current being limited so as not to exceed a preconfigured current limitation threshold;

the current limitation threshold includes an damping current limitation threshold for the target damping current and an extension/contraction current limitation threshold for the target extension/contraction current; and the damping current limitation threshold and the extension/contraction current limitation threshold are configured separately from each other.

2. The electrically powered suspension system according to claim 1, wherein the extension/contraction current limitation threshold is set to a value smaller than the damping current limitation threshold.

3. The electrically powered suspension system according to claim 1, wherein the damping current limitation threshold and the extension/contraction current limitation threshold each is determined on a basis of a current correlation value correlating with the drive current of the electric motor.

4. The electrically powered suspension system according to claim 1, further comprising an information acquisition part that acquires information on a temperature of the drive control unit, wherein the damping current limitation threshold and the extension/contraction current limitation threshold each is determined on a basis of the temperature of the drive control unit.

5. The electrically powered suspension system according to claim 1, further comprising an information acquisition part that acquires information on a temperature of the electric motor, wherein the damping current limitation threshold and the extension/contraction current limitation threshold each is configured on a basis of the temperature of the electric motor.

6. The electrically powered suspension system according to claim 1, wherein the damping current limitation threshold and the extension/contraction current limitation threshold each is separately configured in consideration of at least a priority on riding comfort and driving stability of the vehicle.

* * * * *